US012710139B2

(12) United States Patent
Kim et al.

(10) Patent No.: US 12,710,139 B2
(45) Date of Patent: Aug. 18, 2026

(54) LIQUID HYDROGEN TANK CONTROL DEVICE AND CONTROL METHOD THEREOF

(71) Applicant: H2CREO Corp., Dover, DE (US)

(72) Inventors: Sung Yong Kim, Yongin-si (KR); Hyung Jin Kim, Yongin-si (KR); Jong H Baik, Titusville, FL (US)

(73) Assignee: H2CREO Corp., Dover, DE (US)

( * ) Notice: Subject to any disclaimer, the term of this patent is extended or adjusted under 35 U.S.C. 154(b) by 599 days.

(21) Appl. No.: 18/325,449

(22) Filed: May 30, 2023

(65) Prior Publication Data

US 2024/0175550 A1 May 30, 2024

Related U.S. Application Data

(60) Provisional application No. 63/384,976, filed on Nov. 25, 2022.

(51) Int. Cl.
*F17C 13/02* (2006.01)
*F17C 5/06* (2006.01)

(52) U.S. Cl.
CPC .............. *F17C 13/026* (2013.01); *F17C 5/06* (2013.01); *F17C 2221/012* (2013.01); *F17C 2250/043* (2013.01); *F17C 2250/0439* (2013.01)

(58) Field of Classification Search
None
See application file for complete search history.

(56) References Cited

U.S. PATENT DOCUMENTS 3,667,246 A * 6/1972 St. Lorant ............. F17C 13/026 62/51.1
10,684,157 B2 * 6/2020 Lease ............... B60K 15/03006
11,946,594 B2 * 4/2024 Varrassi ..................... F17C 3/04
2015/0063409 A1 * 3/2015 Juery ..................... F17C 13/021 374/45
2022/0196211 A1 * 6/2022 Finne ..................... F17C 13/026
2023/0023222 A1 * 1/2023 Kwon ...................... B60L 58/33
2024/0175550 A1 * 5/2024 Kim ....................... F17C 13/026

FOREIGN PATENT DOCUMENTS

CN 103328877 B * 6/2015 ................ F17C 9/02
CN 112923235 A * 6/2021 .............. F17C 5/002
DE 4212626 A1 * 10/1993 ....... B60K 15/03006
DE 19910893 A1 * 9/2000 ......... F02M 21/0221
FR 3067820 B1 * 7/2019 ............. H01Q 19/19
KR 20170120402 A * 10/2017 ............ F17C 13/002
KR 20200042176 A * 4/2020 ................ F17C 7/04
(Continued)

OTHER PUBLICATIONS

Thermometer—Britannica Academic (2020) (Year: 2020).*

*Primary Examiner* — Jenna M Maroney
(74) *Attorney, Agent, or Firm* — McDonnell Boehnen Hulbert & Berghoff LLP

(57) ABSTRACT

A liquid hydrogen tank control device is capable of wireless communication. A control board measures a level of liquid hydrogen stored in a storage space of an inner tank of a liquid hydrogen tank based on a plurality of temperature values measured by a plurality of temperature sensors located at different heights from each other on an outer surface of the inner tank located inside an outer tank of the liquid hydrogen tank.

8 Claims, 12 Drawing Sheets

(56) References Cited

FOREIGN PATENT DOCUMENTS

| | | | | | |
|---|---|---|---|---|---|
| KR | 20210125123 | A | | 10/2021 | |
| KR | 102450308 | B1 | * | 10/2022 | ................ F17C 3/08 |
| WO | WO-2005022027 | A1 | * | 3/2005 | .............. F17C 3/025 |
| WO | WO-2013041798 | A2 | * | 3/2013 | ............. G01N 25/00 |
| WO | WO-2023108186 | A1 | * | 6/2023 | .............. F17C 5/007 |

* cited by examiner

<Tank Log Table>

| Tank ID (Total Volume-Manufacture Date-Serial Number | Time Stamp (year-month-day-time) | Total Volume (L) | Previous Level (L) | Refueling (L) | Usage (L) | Current Level (L) | Gauge value (L) | Residual Volume (%) | Note |
|---|---|---|---|---|---|---|---|---|---|
| 12L-20201010-abcdefgh | 2021-01-01-123456 | 12L | 3L | 5L | 2L | 6L | 6L | 50% | |

FIG. 5

<Input Data Log Table>

| Time Stamp (year-month-day-time) | Tank ID (Total Volume-Manufacture Date-Serial Number) | Level Gauge | Temperature sensor | Liquid Level sensor | Pressure Sensor | Mass Flow Rate (In) | Mass Flow Rate (Out) | Mass Flow Rate in front of FC | Temperature in front of Ful Cell | Temperature behind Fuel Cell | Voltage of Fuel Cell (Volt) | Current of Fuel Cell (Ampere) | Output (Watt) |
|---|---|---|---|---|---|---|---|---|---|---|---|---|---|
| 2021-01-01-123456 | 12L-20201010-abcdefgh | L/KG/% | Ti | Li | Pi | ṁi | ṁo | ṁi-FC | Ti-FC | TFC | Voltage | Ampere | Watt |

FIG. 6

LIQUID HYDROGEN TANK CONTROL DEVICE AND CONTROL METHOD THEREOF

FIELD OF THE INVENTION

The present disclosure relates to a liquid hydrogen tank control device and control method thereof, and specifically, to a liquid hydrogen tank control device and control method thereof that is easy to monitor and can measure a level of liquid hydrogen using temperature sensors.

BACKGROUND OF THE INVENTION

As a way to solve problems of air pollution and global warming caused by excessive use of fossil fuels, research on use of non-hydrocarbon fuels has been actively conducted at home and abroad. Among various methods proposed to solve such problems, the most efficient and representative method is use of hydrogen energy.

Conventional technology has two main problems. First, devices for measuring a level of liquid hydrogen inside a liquid hydrogen tank used in a conventional liquid hydrogen tank are very expensive. Moreover, in the conventional technology, in case that a sensor for measuring a level of liquid hydrogen is installed through an outer wall of a tank, heat intrusion through a penetrated part of the tank promotes vaporization of liquid hydrogen in the tank, making it difficult to control flow rate of hydrogen gas.

Meanwhile, in conventional technology, a method using a silicon diode sensor is widely used to measure the temperature of cryogenic materials such as liquid hydrogen. However, silicon diode sensors are sold at a very high price.

In addition, since the conventional method for measuring temperature uses a method of measurement by directly contacting liquid hydrogen inside of liquid hydrogen tank using a temperature sensor, it has been inevitable to install wires, etc. that electrically connect the temperature sensor inside the liquid hydrogen tank and a device outside the tank in order to transfer a measured value to the outside. However, there is a disadvantage in that the internal vaporization of the liquid hydrogen tank is accelerated by conduction heat conducted from an external device through the electric wires, etc. Also, since liquid hydrogen has a very low density, measuring a level of liquid hydrogen by a conventional float method has not been widely used.

Furthermore, there is a disadvantage in that an administrator has to check a value measured from a temperature sensor installed inside a liquid hydrogen tank directly on site through an external device installed in the liquid hydrogen tank.

PRIOR DISCLOSURES (Patent Document 1) Korean Patent Application Publication No. 2021-0125123

SUMMARY OF THE INVENTION

The purpose of the present disclosure is to provide a liquid hydrogen tank control device and control method thereof, and to provide a new solution that is easy to monitor and can solve a problem that internal vaporization of a liquid hydrogen tank is accelerated or that it is difficult to control internal temperature due to heat introduced through a penetrated part of a liquid hydrogen tank or conduction heat conducted from an external device.

According to one aspect of the present disclosure, a liquid hydrogen tank control device is provided. The liquid hydrogen tank control device may include a control board capable of wireless communication and measuring a level of liquid hydrogen stored in a storage space of an inner tank of a liquid hydrogen tank based on a plurality of temperature values measured by a plurality of temperature sensors provided at different heights from each other on an outer surface of the inner tank located inside an outer tank of the liquid hydrogen tank.

In an embodiment, the control board may be configured to determine that liquid hydrogen is filled from a bottom of the storage space of the inner tank to a height of a temperature sensor that outputs a temperature value equal to or lower than a predetermined temperature value based on the temperature values measured by the plurality of temperature sensors.

In an embodiment, the control board may be configured to determine a status of a liquid hydrogen tank based on a pressure value measured by a pressure sensor capable of wireless communication and configured to measure pressure in the storage space of the inner tank.

In an embodiment, the liquid hydrogen tank control device may be configured to further include a memory configured to store status information including a received temperature value of the inner tank; and a display configured to display status information including the received temperature value of the inner tank, wherein the control board is configured to control operation of a heating device configured to increase pressure of the liquid hydrogen tank.

In an embodiment, the control board may be configured to control On/Off of an opening/closing valve provided in a gas discharge pipe connected to the liquid hydrogen tank through a wireless communication module, configured to control electrical output of a fuel cell through a wireless communication module, and configured to control On/Off of a pressure builder through a wireless communication module.

In an embodiment, a control panel may further be included, which is provided in the liquid hydrogen tank control device and configured to allow a user to control at least one of the On/Off control of an opening/closing valve, operation control of an evaporator or a heater, and electrical output control of a fuel cell.

According to another aspect of the present disclosure, a method of controlling a liquid hydrogen tank using a liquid hydrogen tank control device. The liquid hydrogen tank control device may comprise a plurality of temperature sensors provided at different heights from each other on an outer surface of an inner tank located inside an outer tank of the liquid hydrogen tank; at least one pressure sensor configured to measure pressure of a storage space in which liquid hydrogen in the inner tank is stored; and a control board capable of wireless communication and measuring a level of liquid hydrogen stored in the storage space of the inner tank based on a plurality of temperature values measured by the plurality of temperature sensors. The method may comprise: determining a level of liquid hydrogen in the inner tank based on temperature values measured by the plurality of temperature sensors; and determining whether pressure in the inner tank is within an appropriate pressure range based on pressure values measured by the pressure sensor.

In an embodiment, the determining the level of liquid hydrogen stored in the storage space of the inner tank based on the temperature values measured by the plurality of temperature sensors may include: converting electrical signals received from the plurality of temperature sensors into a plurality of temperature values; determining whether all of the plurality of converted temperature values are the same; in case that it is determined that all of the plurality of converted temperature values are the same in the determining whether all of the plurality of converted temperature values are the same, determining whether the plurality of temperature values are within a first temperature value range; in case that it is determined that the plurality of temperature values are within the first temperature value range in the determining whether the plurality of temperature values are within the first temperature value range, determining that the inner tank is full of liquid hydrogen; in case that it is determined that the plurality of temperature values exceed a second temperature value higher than the first temperature value range in the determining whether the plurality of temperature values are within the first temperature value range, determining whether a pressure value of the storage space of the inner tank is smaller than a first pressure value; in response to it being determined that the pressure value of the inner tank is smaller than the first pressure value in the determining whether the pressure value of the storage space of the inner tank is smaller than the first pressure value, determining that the storage space of the inner tank is empty up to a warning level; in response to it being determined that the pressure value of the inner tank is not smaller than the first pressure value in the determining whether the pressure value of the inner tank is smaller than the first pressure value, determining that the level of the storage space of the inner tank is at an empty level; in response to it being determined that all of the plurality of converted temperature values are not the same in the determining whether all of the plurality of converted temperature values are the same, determining whether a temperature value of a second temperature sensor located in a middle and a temperature value of a temperature sensor installed at a position having a lowest height among the plurality of temperature sensors are within the first temperature value range; in response to it being determined that the temperature value of the second temperature sensor located in the middle and the temperature value of the temperature sensor installed at the position having the lowest height among the plurality of temperature sensors are within the first temperature value range in the determining whether the temperature value of the second temperature sensor located in the middle and the temperature value of the temperature sensor installed at the position having the lowest height among the plurality of temperature values are within the first temperature value range, determining that the level of the storage space of the inner tank is at a medium level; in response to it being determined that the temperature value of the second temperature sensor located in the middle and the temperature value of the temperature sensor installed at the position having the lowest height are within the first temperature value range in the determining whether the temperature value of the second temperature sensor located in the middle and the temperature value of the temperature sensor installed at the position having the lowest height value among the plurality of temperature values are within the first temperature value range, determining that whether the temperature value of the temperature sensor installed at the position having the lowest height is within the first temperature value range; in response to it being determined that the temperature value of the temperature sensor installed at the position having the lowest height is within the first temperature value range, determining that the level of the storage space of the inner tank is at a low level; and in response to it being determined that the temperature value of the temperature sensor installed at the position having the lowest height is not within the first temperature value range, determining that the level of the storage space of the inner tank is at an empty level.

In an embodiment, the determining whether the pressure of the inner tank is within the appropriate pressure range based on the pressure values measured by the pressure sensor may include: switching a pressure builder for adjusting a pressure in the storage space of the inner tank to a predetermined pressure to an operating status in case that a measured pressure value is smaller than the first pressure value; and switching the operating status of the pressure builder to an interrupted status in case that the measured pressure value is larger than a second pressure value higher than the first pressure value.

Therefore, the liquid hydrogen tank control device of the present disclosure can increase management convenience because it enables remote temperature monitoring using a temperature sensor capable of wireless communication without an administrator's directly monitoring of the temperature of a tank on site where the liquid hydrogen tank is installed.

The liquid hydrogen tank control device of the present disclosure can more accurately measure a level of liquid hydrogen using temperature sensors installed at various heights on an outer surface of an inner tank, and can solve a problem that internal vaporization of the liquid hydrogen tank is accelerated, or that it is difficult to control internal temperature due to heat flowing into the inner tank or conduction heat conducted from an external device due to a sensor for measuring a level or a sensor for measuring temperature installed inside the inner tank.

The liquid hydrogen tank control device of the present disclosure includes a device monitoring and controlling the liquid hydrogen tank by attaching a control panel in an on-board form to the liquid hydrogen tank.

BRIEF DESCRIPTION OF THE DRAWINGS

FIG. 5 is a table illustrating a log including status information of a liquid hydrogen tank controlled by a liquid hydrogen tank control device according to an embodiment of the present disclosure.

FIG. 6 is a table illustrating a log including status information of each of a liquid hydrogen tank and a fuel cell controlled by a liquid hydrogen tank control device in accordance with an embodiment of the present disclosure.

DESCRIPTION OF THE INVENTION

Figure 1:
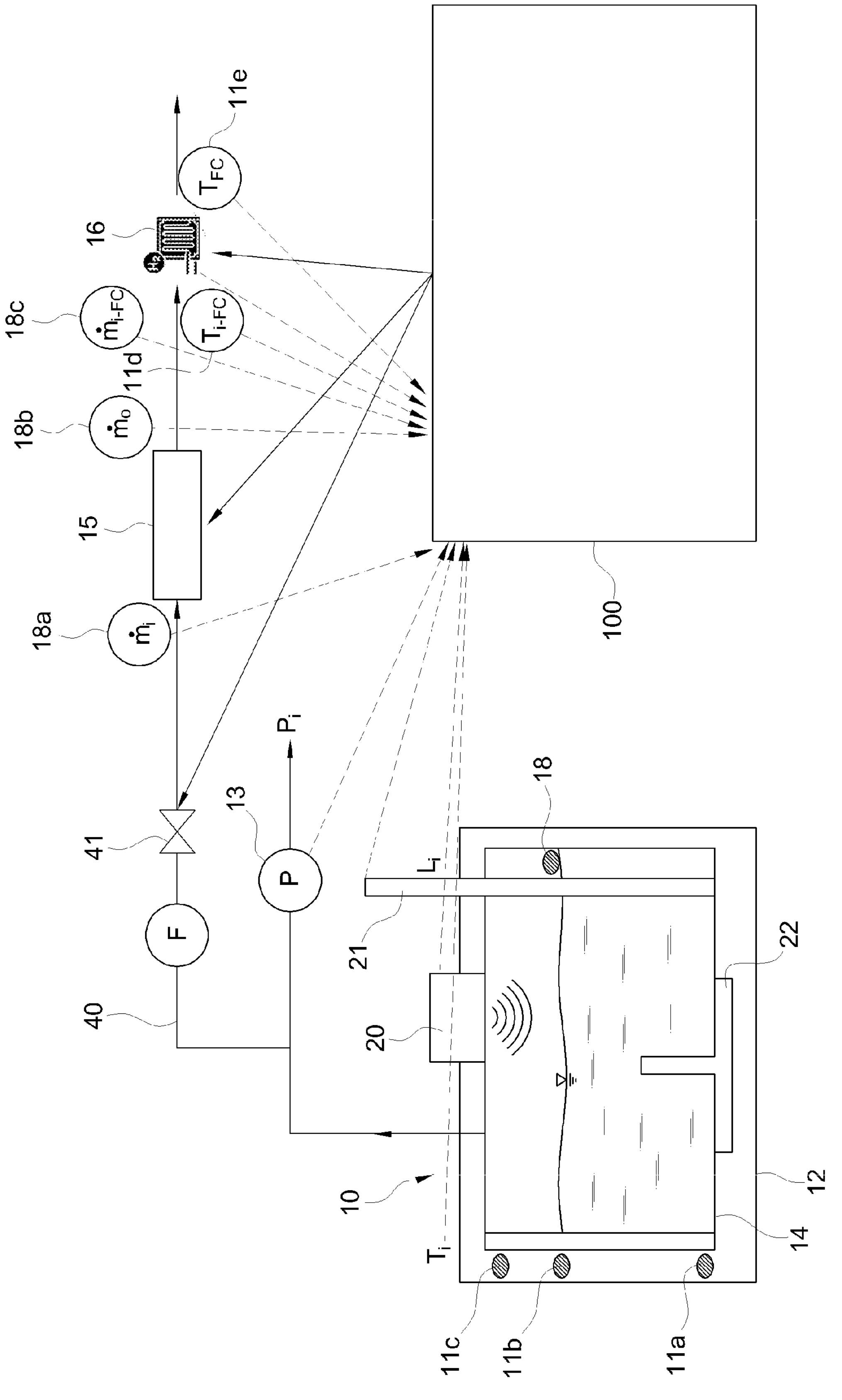
FIG. 1 is a conceptual diagram illustrating an appearance of a liquid hydrogen tank control device, a liquid hydrogen tank, and a fuel cell, etc. according to an embodiment of the present disclosure.

Hereinafter, with reference to the accompanying drawings, the embodiments of the present disclosure will be described in detail so that those of ordinary skill in the art to which the present disclosure pertains can readily implement them. However, the present disclosure may be implemented in several different forms and is not limited to the embodiments described herein.

In order to clearly explain the present disclosure in the drawings, parts irrelevant to the description are omitted, and similar reference numerals are attached to similar parts throughout the specification.

Throughout the specification, when a part "includes" or "comprises" a certain component, it means that other components may be further included, rather than excluding other components, unless otherwise stated.

It is to be understood that the techniques described in the present disclosure are not intended to be limited to specific embodiments, and include various modifications, equivalents, and/or alternatives of the embodiments of the present disclosure.

Hereinafter, an embodiment of the present disclosure will be described with reference to the attached drawings. However, in the following description, to avoid unnecessarily obscuring the essentials of the present disclosure, detailed descriptions of well-known functions or configurations will be omitted in the following description.

FIG. 1 is a conceptual diagram illustrating an appearance of a liquid hydrogen tank control device 100, a liquid hydrogen tank 10, and a fuel cell 16 according to an embodiment of the present disclosure. In addition, FIG. 2 is a conceptual diagram illustrating some components of the liquid hydrogen tank control device 100 according to an embodiment of the present disclosure.

Figure 2:
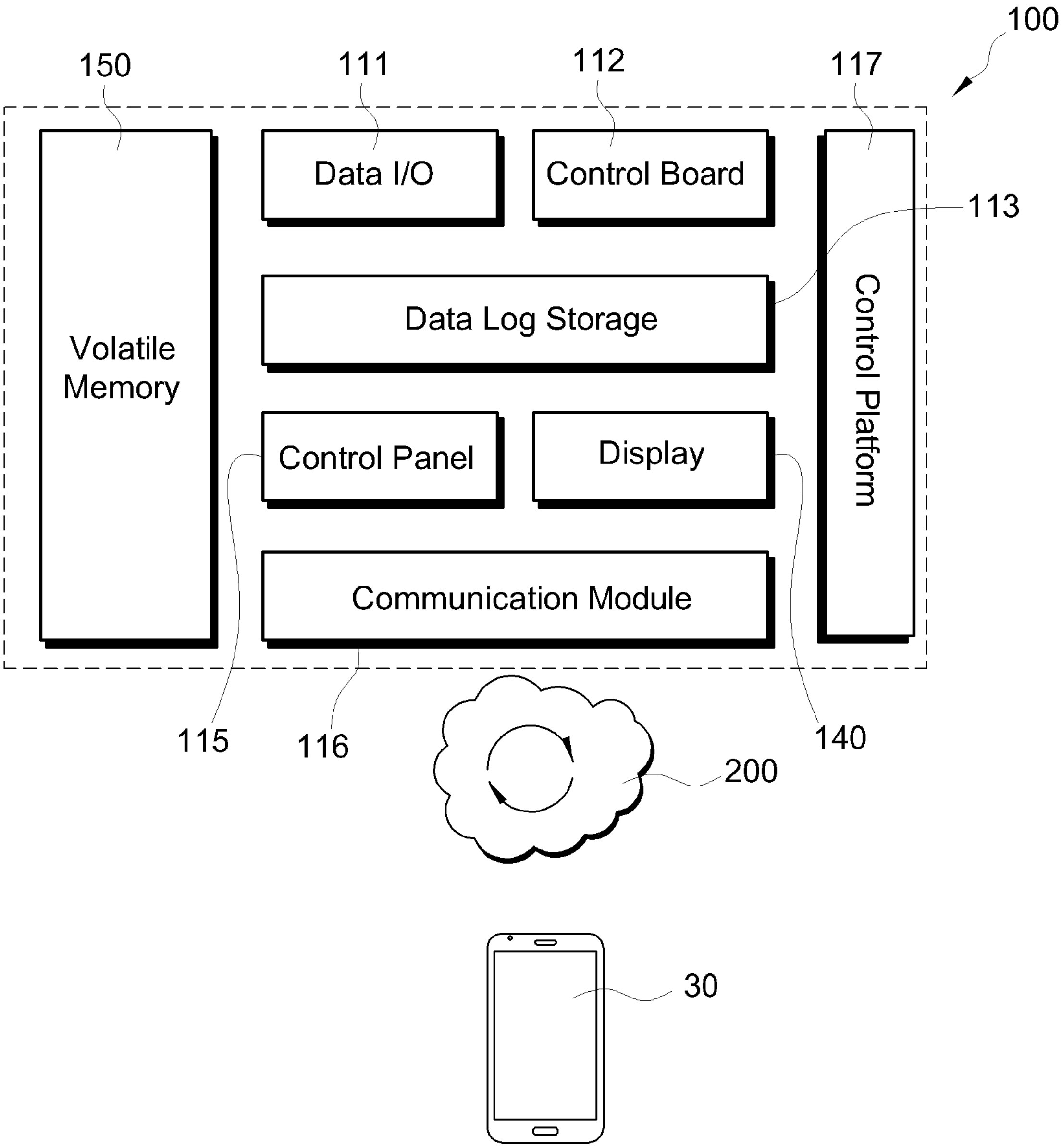
FIG. 2 is a conceptual diagram illustrating some components of a liquid hydrogen tank control device according to an embodiment of the present disclosure.

Referring to FIG. 1 and FIG. 2, the liquid hydrogen tank control device 100 according to an embodiment of the present disclosure includes a control board 112 measuring a level of liquid hydrogen stored in a storage space of an inner tank 14 based on a plurality of temperature values measured by temperature sensors 11*a*, 11*b*, 11*c*.

Specifically, the plurality of temperature sensors 11*a*, 11*b*, 11*c* is configured to be located on an outer surface of the inner tank 14 located inside an outer tank 12 of the liquid hydrogen tank 10. The plurality of temperature sensors 11*a*, 11*b*, 11*c* is provided at different heights on the outer surface of the inner tank 14. For example, as illustrated in FIG. 1, a first temperature sensor 11*a* may be located at a lowest position among the temperature sensors 11*a*, 11*b*, 11*c*. A second temperature sensor 11*b* may be located at a medium position among the temperature sensors 11*a*, 11*b*, 11*c*. A third temperature sensor 11*c* may be located at a top position among the temperature sensors 11*a*, 11*b*, 11*c*. Depending on a type of a level to be measured, such temperature sensors may be placed at three or more positions.

Also, the plurality of temperature sensors 11*a*, 11*b*, 11*c* may be configured to transmit measured temperature values to the control board 112 through wireless communication. For example, the plurality of temperature sensors 11*a*, 11*b*, 11*c* may be equipped with a separate wireless communication unit (not shown) configured to transmit the measured temperature values by wireless communication.

Here, each of the plurality of temperature sensors 11*a*, 11*b*, 11*c* may be applied by adopting a temperature sensor measuring temperature through contact with an object. For example, it may be at least one of a thermocouple, a Resistance Temperature Detector (RTD), a thermistor, and an infrared temperature sensor using principles and characteristics of a resistance value changing according to the temperature. Preferably, each of the plurality of temperature sensors 11*a*, 11*b*, 11*c* of the present disclosure may be a thermocouple. For example, in case that the temperature sensor 11*a* is an analog type, a circuit for digitization may be added to convert the temperature information into a digital type and then output this as an electrical signal; and the temperature sensor 11*a* may transmit the electrical signal output in this way to a data I/O 111 through a wireless communication unit (not shown).

Accordingly, the liquid hydrogen tank control device 100 of the present disclosure can increase management convenience because it enables remote temperature monitoring using the temperature sensor 11*a* capable of wireless communication without an administrator's directly monitoring temperature of a liquid hydrogen tank 10 on site where the liquid hydrogen tank 10 is installed. Furthermore, the liquid hydrogen tank control device 100 of the present disclosure can solve a problem that internal vaporization of the liquid hydrogen tank 10 of the conventional technology is accelerated or that it is difficult to control the internal temperature due to heat introduced through a penetrated part (not shown) of the liquid hydrogen tank 10 or conduction heat conducted from an external device.

However, each of the plurality of temperature sensors 11*a*, 11*b*, 11*c* of the present disclosure is not necessarily located only on the outer surface of the inner tank 14; but may also be further installed on an inner surface of the inner tank 14. However, the temperature sensor 11*a* installed on the inner surface of the inner tank 14 may be applied with a temperature sensor 11*a* capable of measuring temperature even at cryogenic temperature of liquid hydrogen. For example, a silicon diode sensor (not shown) may be separately installed inside the inner tank 14.

For example, each of the plurality of temperature sensors 11*a*, 11*b*, 11*c* may be configured to detect a change in surface temperature of the inner tank 14 due to a charged amount of liquid hydrogen and generate an electrical signal. For example, the plurality of temperature sensors 11*a*, 11*b*, 11*c* may be configured to measure temperature on a surface of an outer wall of the inner tank 14.

The control board 112 of the liquid hydrogen tank control device 100 of the present disclosure may be configured to measure a level of liquid hydrogen stored in the storage space of the inner tank 14 based on the plurality of temperature values measured by the plurality of temperature sensors 11*a*, 11*b*, 11*c*.

The control board 112 may be configured to determine that gas is filled from a ceiling of the storage space of the inner tank 14 to a position of any one temperature sensor outputting a temperature value higher than a predetermined temperature value, based on the temperature values measured by each of the first temperature sensor 11*a*, the second temperature sensor 11*b*, and the third temperature sensor 11*c*. For example, in case that a temperature measured by the third temperature sensor 11*c* is higher than a predetermined temperature, as illustrated in FIG. 1, it may be determined that gaseous hydrogen is filled up to a height of the third temperature sensor 11*c* measured higher than the predetermined temperature among the first temperature sensor 11*a*, the second temperature sensor 11*b*, and the third temperature sensor 11*c*. Accordingly, the liquid hydrogen tank control device 100 of the present disclosure can measure the level of liquid hydrogen more accurately as more temperature sensors are used at various heights.

The control board 112 may be configured to determine that liquid hydrogen is filled from a bottom of the storage space of the inner tank 14 to a height of the temperature sensor 11*b* outputting a temperature value equal to or lower than a predetermined criterion temperature value, based on the temperature values measured by the first temperature sensor 11*a*, the second temperature sensor 11*b*, and the third temperature sensor 11*c*. For example, as illustrated in FIG. 1, among the first temperature sensor 11*a*, the second temperature sensor 11*b*, and the third temperature sensor 11*c*, in case that a temperature value of the second temperature sensor 11*b* located in a middle is measured equal to or lower than a predetermined criterion temperature, and that a temperature value of the third temperature sensor 11*c* located at a relatively high position is measured higher than a predetermined criterion temperature, it may be determined that liquid hydrogen is filled up to the height of the second temperature sensor 11*b* located in the middle. For example, the predetermined criterion temperature may be 20K (kelvin).

The control board 112 of the liquid hydrogen tank control device 100 according to an embodiment of the present disclosure may be configured to determine a status of the liquid hydrogen tank based on a pressure value measured by a pressure sensor 13 configured to measure the pressure in the storage space of the inner tank 14. Here, the pressure sensor 13 may be configured to measure the pressure of the liquid hydrogen tank 10, convert the measurement result into an electrical signal, and output the electrical signal. For example, any known pressure sensor that can be used for measuring the pressure of the liquid hydrogen tank 10 can be applied to the present embodiment as the pressure sensor 13. For example, the pressure sensor 13 may transmit the measured pressure value to the control board 112 through wireless communication or wired communication.

Also, the pressure sensor 13 may be configured to transmit the measured pressure value to the control board 112 through wireless communication. For example, the pressure sensor 13 may be equipped with a wireless communication unit (not shown) configured to transmit the measured pressure value by wireless communication.

Meanwhile, referring to FIG. 1 and FIG. 2 again, the control board 112 of the liquid hydrogen tank control device 100 according to another embodiment of the present disclosure may be configured to receive measured values measured by each of a level gauge 20 and a liquid level sensor 21. Here, the level gauge 20, for example, may be configured to measure a level of liquid hydrogen contained in the inner tank 14 using a laser or the like. The liquid level sensor 21 may be configured to measure a level of liquid hydrogen contained in the inner tank 14. For example, the liquid level sensor 21 may include a magnetic float 18 rising and falling with the level of liquid hydrogen in the inner tank 14.

Also, the control board 112 may be configured to control operation of a heating device 22. For example, in case that it is necessary to supply hydrogen gas to the fuel cell 16, the control board 112 may be configured to heat the liquid hydrogen contained in the inner tank 14 by operating the heating device 22. Alternatively, in case that it is necessary to reduce an amount of hydrogen gas supplied to the fuel cell 16, the control board 112 may be configured to turn off the operation of the heating device 22. At this time, the control board 112 may control operation of the heating device 22 using wireless communication.

In addition, the liquid hydrogen tank control device 100 may further include a data I/O 111, a control board 112, a data log storage 113, a control panel 115, a display 140, a communication module 116, and a control platform 117. For example, the data I/O 111 may be configured to collect sensing information from each of a first flowmeter 18*a* measuring flow rate of gaseous hydrogen flowing into a fourth temperature sensor 11*d*, a fifth temperature sensor 11*e*, the level gauge 20, the liquid level sensor 21, the pressure sensor 13, an evaporator 15, or a heater (not shown); a second flowmeter 18*b* measuring the flow rate of gaseous hydrogen discharged from the evaporator 15 or the heater; a third flowmeter 18*c* measuring the flow rate of gaseous hydrogen flowing into the fuel cell 16; the fourth temperature sensor 11*d* measuring a temperature of gaseous hydrogen flowing into the fuel cell 16; the fifth temperature sensor 11*e* measuring a temperature of the fuel cell 16; and the fuel cell 16. Although the present embodiment illustrated in FIG. 1 shows the evaporator 15, it is also possible to apply a heater (not shown) instead of the evaporator 15.

Figure 3:
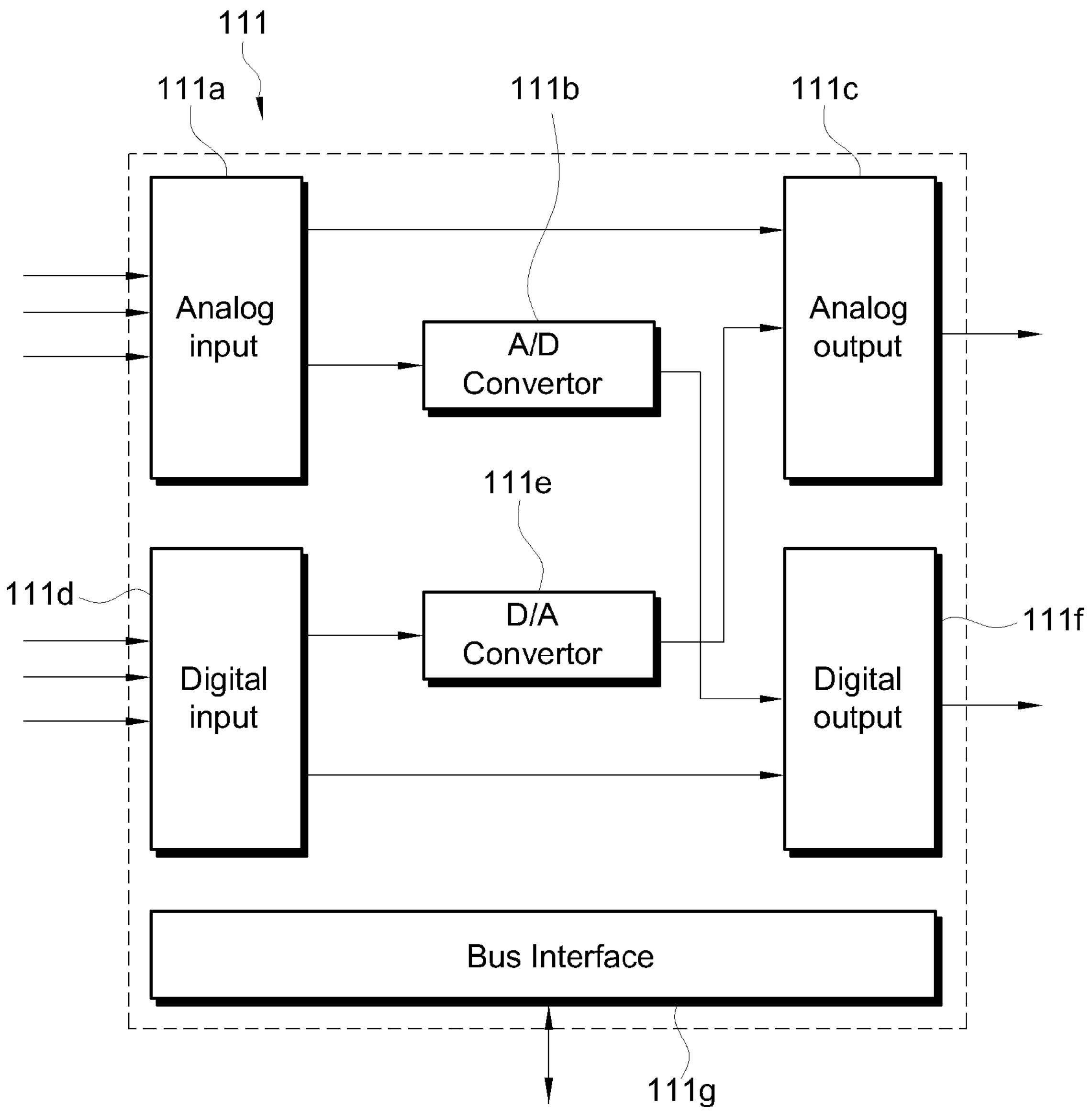
FIG. 3 is a conceptual diagram illustrating an internal configuration of a data I/O of a liquid hydrogen tank control device according to an embodiment of the present disclosure.

FIG. 3 is a conceptual diagram illustrating an internal constitution of the data I/O 111 of a liquid hydrogen tank control device according to an embodiment of the present disclosure.

Referring to FIG. 3 along with FIG. 1 and FIG. 2, the data I/O 111 may receive from the fuel cell 16 voltage and current information that is output from the fuel cell 16. More specifically, the data I/O 111 may provide an input/output to the data log storage 113, the control panel 115 or the display 140, the communication module 116, and the control board 112. Also, the data I/O 111 may be configured to process input/output values of each of the temperature sensors 11*a*, 11*b*, 11*c*, 11*d*, 11*e*, the pressure sensor 13, the liquid level sensor 21, a timer (not shown), a relay (not shown), and an opening/closing valve 41. The liquid hydrogen tank control device 100 of the present disclosure may monitor, analyze, and control the liquid hydrogen tank 10 through the data processed by the data I/O 111 in this way.

Specifically, the data I/O 111 may receive a signal and convert the received signal into a digital output 111*c* through an A/D converter 111*b* in case that the received signal is an analog input 111*a*. Also, the data I/O 111 may convert the received signal into an analog output 111*f* through a D/A converter 111*e* in case that the received signal is a digital input 111*d*. The data I/O 111 may perform signal processing for conversions such as current to voltage, voltage to current, and the like, as well as transmitting voltage values and current values to other components.

The data I/O 111 may be configured to receive AC and DC voltages, AC and DC currents, and signals (wavelengths) of a specific frequency. Also, the data I/O 111 may be configured to receive signals from a gyroscope, an accelerometer thermocouple, a thermistor, a Resistance Temperature Detector (RTD), a strain gauge, a Linear Variable Differential Transformer (LVDT), and a rotary variable differential transformer (RVDT). In addition, a flowmeter (not shown), a timer (not shown), a relay (not shown), and a switch (not shown) may be configured to provide an input/output to the data I/O 111.

For the data I/O 111, for example, serial or parallel connections of RS232 (Recommended Standard 232), RS422 (Recommended Standard 422) or RS485 (Recommended Standard 485); general serial bus (USB); general interface bus (GPIB); Small Computer System Interface (SCSI); or Transistor-Transistor Logic (TTL) may be used through bus interface 111*g*.

For network connections of the data I/O 111, CANbus, DeviceNet, Smart Distributed System (SDS), Versa Module Eurocard (VME) bus, Foundation Fieldbus, Profibus, ARCnet, Serial Real-Time Communication System (SERCOS), Interbus-S, Seriplex, AS-I, and Beckhoff may be used. Ethernet and IEEE 1394 may be used for both host and network connections.

For example, the control board 112 may be configured to control the opening/closing valve 41 configured to control pressure of the liquid hydrogen tank 10 and flow rate of hydrogen gas discharged from the liquid hydrogen tank 10. For example, the opening/closing valve 41 may be a solenoid valve, a pneumatic valve, or the like. For example, the control board 112 may be configured to control operation of an external evaporator 15 or a heater (not shown). For example, the control board 112 may be configured to adjust output of the fuel cell 16. The communication module 116 may be a wireless communication module capable of wirelessly communicating with an external administrator terminal 30 through a network 200. For example, the communication module 116 may be configured to transmit information collected by the data I/O 111 to the external administrator terminal 30.

Figure 4:
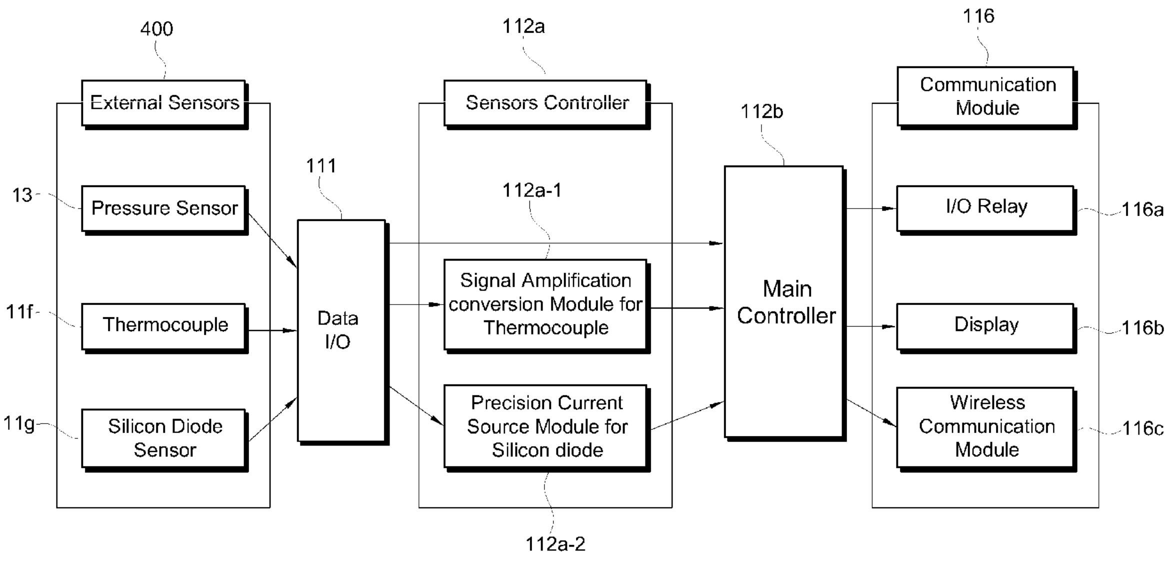
FIG. 4 is a conceptual diagram illustrating a relationship between some components of a liquid hydrogen tank control device according to an embodiment of the present disclosure.

FIG. 4 is a conceptual diagram illustrating a relationship between some components of a liquid hydrogen tank control device 100 according to an embodiment of the present disclosure.

Referring to FIG. 4 along with FIG. 1 and FIG. 2, the liquid hydrogen tank control device 100 according to an embodiment of the present disclosure may include external sensors 400 and a communication module 116.

Specifically, the external sensors 400 may include a pressure sensor 13, a thermocouple 11*f*, and a silicon diode sensor 11*g*. In addition, the control board 112 may include a sensors controller 112*a* and a main controller 112*b*. Specifically, the sensors controller 112*a* may include a signal amplification conversion module for thermocouple 112*a*-1, and a precision current source module for silicon diode 112*a*-2.

Specifically, the signal amplification conversion module for thermocouple 112*a*-1 is a module amplifying a voltage value measured by the thermocouple 11*f* to 28-80 microvolts (μV) per temperature of 1 degree, and converts the amplified value into a temperature value through linear regression analysis. In general, the National Institute of Standards and Technology (NIST) and others perform linear regression analysis using the following Equation (1) of Polynomial function models.

<Polynomial Function Models>

$$y = a_n x^n + a_{n-1} x^{n-1} + \cdots + a_2 x^2 + a_1 x + a_0 \quad \text{Equation (1)}$$

However, at a temperature of 20K for liquid hydrogen, many errors occurred in case of using the NIST method. Accordingly, the liquid hydrogen tank control device 100 of the present disclosure may perform linear regression analysis using Equation (2) of Rational Function Models.

<Rational Function Models>

$$y = \frac{a_n x^n + a_{n-1} x^{n-1} + \ldots + a_2 x^2 + a_1 x + a_0}{b_m x^m + b_{m-1} x^{m-1} + \ldots + b_2 x^2 + b_1 x + b_0} \quad \text{Equation (2)}$$

The precision current source module for silicon diode 112*a*-2 needs to flow a constant current at cryogenic temperatures, for example, an accurate current in units of 10 μA or 100 μA. The sensors controller 112*a* of the present disclosure may be configured to convert a voltage generated through the precision current source module 112*a*-2 into a temperature value using the linear regression analysis.

The communication module 116 may include an input/output relay module (I/O relay module) 116*a*, a display module 116*b*, and a wireless communication module 116*c*. For example, the wireless communication method of the wireless communication module 116*c* may be, for example, Wi-Fi, Bluetooth, Zigbee, Radio Frequency (RF), etc.

For example, as illustrated in FIG. 4, the data I/O 111 of the liquid hydrogen tank control device 100 may receive measured values measured by the external sensors 400, convert them into a digital output 111*c*, and transmit the converted digital output 111*c* to the sensors controller 112*a* and the main controller 112*b*.

Furthermore, the liquid hydrogen tank control device 100 may include a memory. Specifically, the memory may be configured to store status information that includes temperature values of the inner tank 14 received by the Data I/O 111. The memory includes at least one of a volatile memory 150 and a non-volatile memory (not shown). For example, the volatile memory 150 may consist of at least one of a read only memory (ROM) and a Random Access Memory (RAM). For example, the non-volatile memory may store a plurality of application programs or applications driven by a processor, and data and instructions readable by the processor. For example, the non-volatile memory may be configured to store status information (log data) of the liquid hydrogen tank 10. For example, the non-volatile memory may include various storage spaces such as a Hard Disk Drive (HDD), a Solid Status Disk (SSD), a Silicon Disk Drive (SDD), a ROM, a RAM, an EPROM, a flash drive, a hard drive, and a cloud over network, etc. For example, the data log storage 113 may be a non-volatile memory.

FIG. 5 is a table illustrating a log including status information of a liquid hydrogen tank 10 controlled by a liquid hydrogen tank control device 100 according to an embodiment of the present disclosure. In addition, FIG. 6 is a table illustrating a log including status information of each of a liquid hydrogen tank 10 and a fuel cell 16 controlled by a liquid hydrogen tank control device 100 according to an embodiment of the present disclosure.

Referring to FIG. 5 and FIG. 6, the liquid hydrogen tank control device 100 of the present disclosure may be configured to store first log data including status information of the liquid hydrogen tank 10 controlled by the liquid hydrogen tank control device 100, and second log data including status information of each of the liquid hydrogen tank 10 and the fuel cell 16 controlled by the liquid hydrogen tank control device 100, respectively, in the data log storage.

For example, the first log data, as illustrated in the table in FIG. 5, may include a Tank ID including a tank capacity, manufacturing date, and serial number, a timestamp (year, month, day, hour) indicating a measured time, a total volume of liquid hydrogen that can be contained (liters), a previous initial volume of liquid hydrogen (liters), an amount used after charging of liquid hydrogen (liters), a current volume of liquid hydrogen (liters), a volume measured by the gauge (liters), percentage of residual liquid hydrogen (%), and a note item for inputting a content corresponding to a remark.

For example, the second log data, as illustrated in the table in FIG. 6, may include a timestamp (year, month, day, hour) indicating a measured time, a Tank ID including tank capacity, manufacturing date, and serial number, a level gauge (L/kg/%), a temperature value of the temperature sensor 11$a$ (Ti), a measured value of the liquid level sensor (Li), a measured value of the pressure sensor 13 (Pi), a measured value of gaseous hydrogen flow rate (mi) flowing into an inlet of the evaporator (15) or the heater, a measured value of gaseous hydrogen flow rate ($\dot{m}$o) discharged from an outlet of the evaporator 15 or the heater, a measured value of gaseous hydrogen flow rate ($\dot{m}$i-FC) flowing into the fuel cell 16, a measured value of a temperature of gaseous hydrogen (Ti-FC) flowing into the fuel cell 16, a measured temperature value of gaseous hydrogen (TFC) discharged from the fuel cell 16, a voltage and an amperage of the electricity output from the fuel cell 16, and an output (Watts) of the fuel cell 16.

Figure 7:
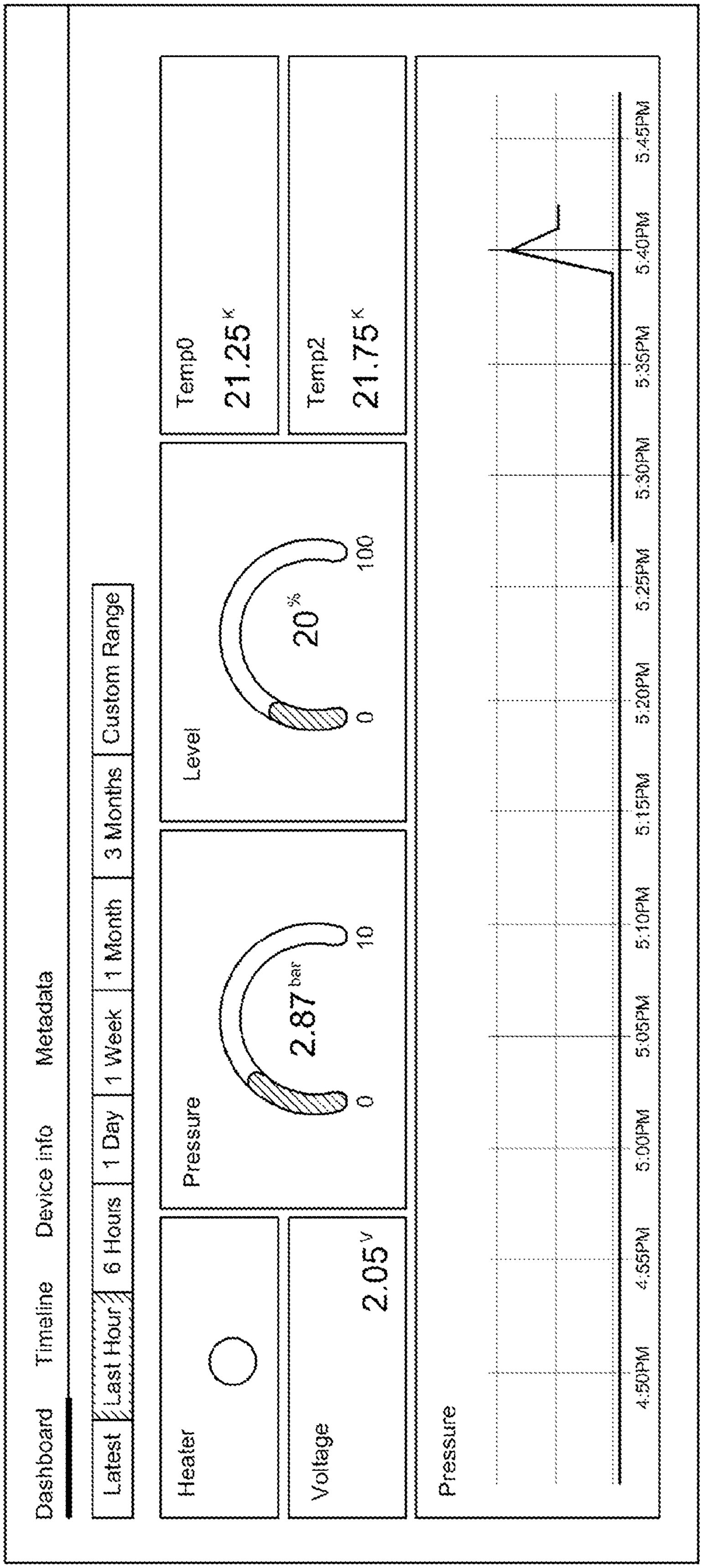
FIG. 7 is an image illustrating a monitorable control dashboard shown on a display of a liquid hydrogen tank control device according to an embodiment of the present disclosure.

FIG. 7 is an image illustrating an appearance of a monitorable control dashboard shown on a display 140 of a liquid hydrogen tank control device 100 according to an embodiment of the present disclosure.

Referring to FIG. 7 along with FIG. 1 to FIG. 4, the display 140 may be configured to display status information including a temperature value of the inner tank 14 received by the data I/O 111. For example, the display 140 may be a touch pad configured to enable a user to select a screen by directly touching the screen.

For example, the display 140 may be configured to display a control dashboard capable of monitoring a status of the liquid hydrogen tank 10 illustrated in FIG. 7.

The control board 112 may be configured to turn On/Off of the evaporator 15 or the heater configured to raise a temperature of the liquid hydrogen tank 10.

Meanwhile, the control board 112 may be configured to control On/Off of the opening/closing valve 41 through wireless communication of the communication module 116. The opening/closing valve 41 may be provided in a gas discharge pipe 40 connected to the liquid hydrogen tank 10.

The control board 112 may be configured to control operation of a switch (not shown) of the evaporator 15 or the heater. For example, the control board 112 may control the switch of the evaporator 15 or the heater to turn on the evaporator 15 or the heater so that the pressure of the inner tank 14 rises to a predetermined pressure. Alternatively, the control board 112 may control the switch of the evaporator 15 or the heater to turn off the evaporator 15 or the heater when a pressure of the inner tank 14 rises to a predetermined pressure. Here, the heating device 22 may be configured to evaporate liquid hydrogen inside the liquid hydrogen tank 10 by heating the liquid hydrogen tank 10.

The control board 112 may be configured to control electrical output of the fuel cell 16. For example, the control board 112 may control the fuel cell 16 to generate an output (Watts) in a predetermined range.

The control board 112 is configured to turn On/Off the opening/closing valve 41 and the heater 22 that adjusts pressure in the storage space of the inner tank 14 to a predetermined pressure through the wireless communication module 116.

Figure 8:
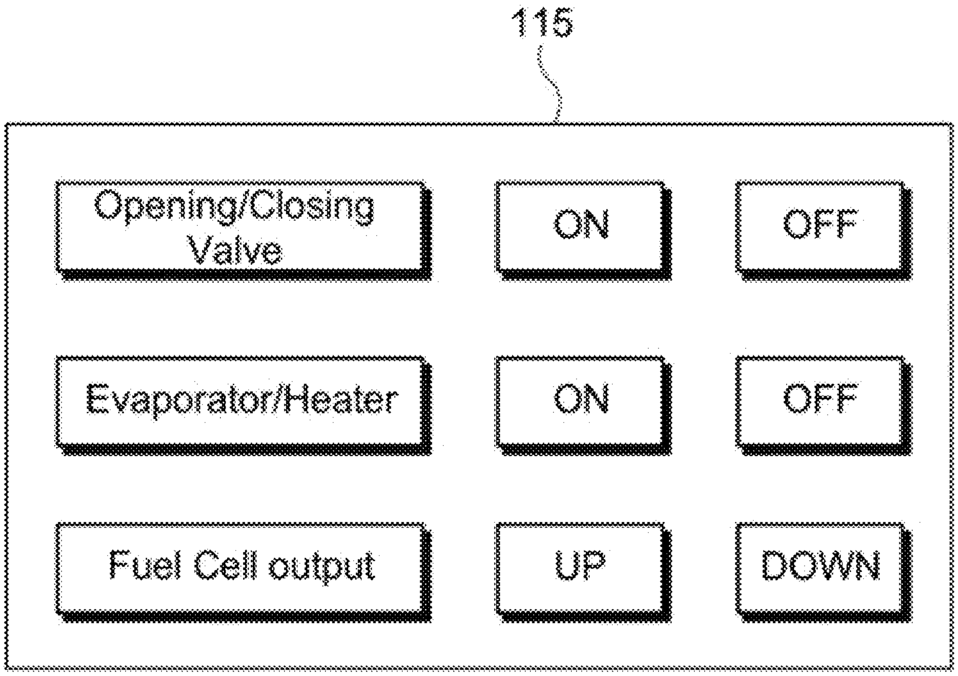
FIG. 8 is a schematic diagram illustrating an appearance of a control panel shown on a display of a liquid hydrogen tank control device according to an embodiment of the present disclosure.

FIG. 8 is a schematic diagram illustrating an appearance of a control panel 115 shown on a display 140 of a liquid hydrogen tank control device 100 according to an embodiment of the present disclosure.

Referring to FIG. 8 along with FIG. 1 and FIG. 4, the liquid hydrogen tank control device 100 of the present disclosure further includes a control panel 115. Specifically, the control panel 115 may be provided in the liquid hydrogen tank 10. For example, the control panel 115 may be attached in an on-board form to the liquid hydrogen tank 10.

The control panel 115 may be configured to allow the user to control at least one of On/Off control of the opening/closing valve 41, operation control of the evaporator 15 or the heater (not shown), and electrical output control of the fuel cell 16. For example, as illustrated in FIG. 8, the control panel 115 is equipped with an "ON" button and an "OFF" button of the opening/closing valve 41, an "ON" button and an "OFF" button of the evaporator/heater, and electrical output "UP"/"DOWN" buttons of the fuel cell 16.

Figure 9:
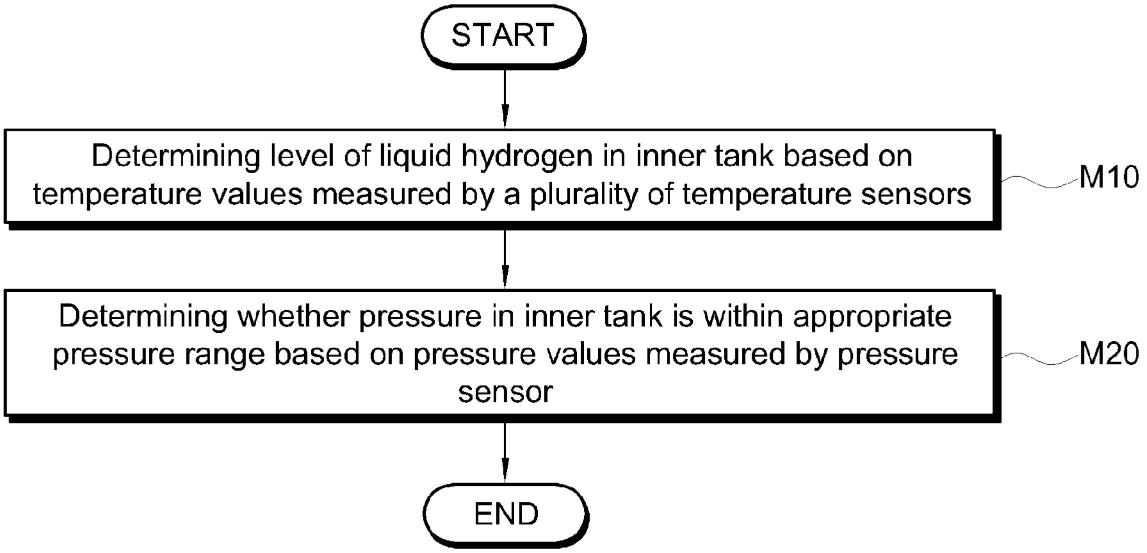
FIG. 9 is a flowchart illustrating steps of a method of controlling a liquid hydrogen tank according to an embodiment of the present disclosure.

FIG. 9 is a flowchart illustrating steps of a method of controlling the liquid hydrogen tank 10 according to an embodiment of the present disclosure.

Referring to FIG. 9 along with FIG. 1 and FIG. 2, the method of controlling a liquid hydrogen tank 10 of the present disclosure is a method of controlling the liquid hydrogen tank 10 using the liquid hydrogen tank control device 100.

The liquid hydrogen tank control device 100 includes a control board 112 configured to analyze the status of the liquid hydrogen tank 10 based on measured values measured by each of the plurality of temperature sensors 11$a$, 11$b$, 11$c$ and at least one pressure sensor 13. Specifically, the plurality of temperature sensors 11$a$, 11$b$, 11$c$ is provided on an outer surface of the inner tank 14 located inside the outer tank 12 of the liquid hydrogen tank 10. Each of the plurality of temperature sensors 11$a$, 11$b$, 11$c$ is provided at different heights from each other on the outer surface of the inner tank 14.

At least one pressure sensor 13 may be configured to measure pressure of a storage space in which liquid hydrogen is stored in the inner tank 14. At least one pressure sensor 13 may be provided in the gas discharge pipe 40 configured to discharge gaseous hydrogen generated inside the inner tank 14 to outside.

The control board 112 is configured to measure a level of liquid hydrogen stored in the storage space of the inner tank 14 based on a plurality of temperature values measured by the plurality of temperature sensors 11$a$, 11$b$, 11$c$. For example, the control board 112 may be configured to determine that liquid hydrogen is filled from a bottom of the storage space of the liquid hydrogen tank 10 to a height of the temperature sensor 11$b$ outputting a temperature value equal to or lower than a predetermined temperature value based on the temperature values measured by each of the plurality of temperature sensors 11$a$, 11$b$, 11$c$. For example, as illustrated in FIG. 1, in case that temperature values measured by the temperature sensors 11$b$, 11$c$ located relatively below among the three temperature sensors 11$a$, 11$b$, 11$c$ are measured to be equal to or lower than a predetermined temperature, it may be determined that liquid hydrogen is filled up to a position of the second temperature sensor 11$b$. For example, the predetermined criterion temperature value may be 20K.

In addition, the method of controlling the liquid hydrogen tank 10 of the present disclosure includes determining the level of liquid hydrogen in the storage space of the inner tank 14 based on the temperature values measured by the plurality of temperature sensors 11*a*, 11*b*, 11*c* (M10), and determining whether the pressure in the inner tank 14 is within an appropriate pressure range based on pressure values measured by the pressure sensor 13 (M20).

Figure 10:
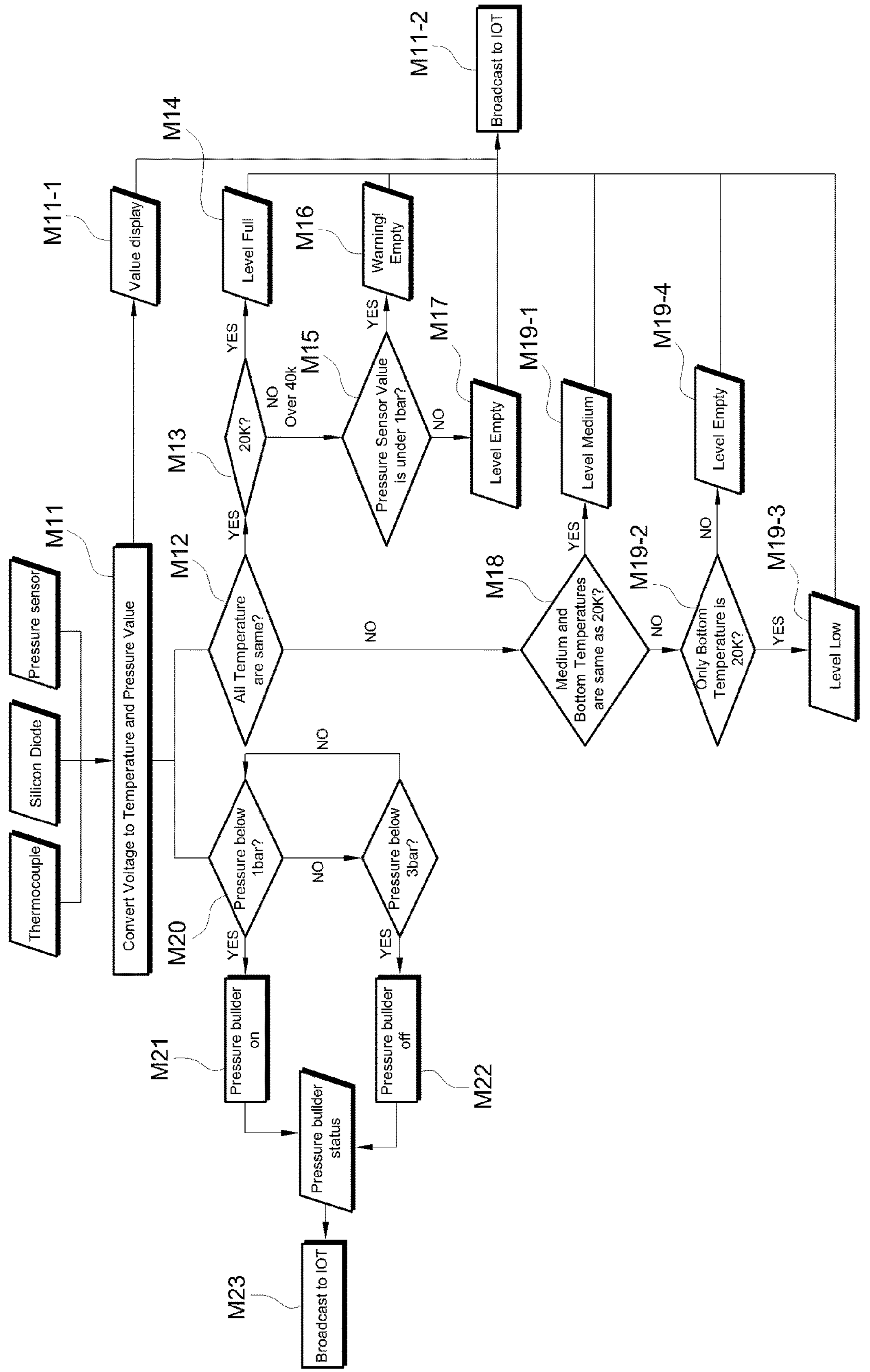
FIG. 10 is a flowchart illustrating some steps of a method of controlling a liquid hydrogen tank according to an embodiment of the present disclosure.

FIG. 10 is a flowchart illustrating some steps of a method of controlling a liquid hydrogen tank 10 according to an embodiment of the present disclosure.

Referring to FIG. 10, determining a level of liquid hydrogen stored in a storage space of the inner tank 14 based on the temperature values measured by a plurality of temperature sensors 11*a*, 11*b*, 11*c* (M10) of the method of controlling the liquid hydrogen tank 10 includes converting electrical signals received from the plurality of temperature sensors 11*a*, 11*b*, 11*c* and at least one pressure sensor 13 into a plurality of temperature values and pressure values (M11).

The determining the level of liquid hydrogen stored in the storage space of the inner tank 14 (M10) includes determining whether all of a plurality of converted temperature values are the same (M12).

The determining the level of liquid hydrogen stored in the storage space of the inner tank 14 (M10) includes, in case that it is determined that all of a plurality of converted temperature values are the same in the determining whether all of the plurality of converted temperature values are the same, determining whether the plurality of temperature values are within a first temperature value range (M13). For example, a first temperature value may be 20K.

The determining the level of liquid hydrogen stored in the storage space of the inner tank 14 (M10) includes, in case that it is determined that the plurality of temperature values are within the first temperature value range in the determining whether the plurality of temperature values are within the first temperature value range (M13), determining that the inner tank 14 is full of liquid hydrogen (M14). For example, the first temperature value range may be about 20K (kelvin).

The determining the level of liquid hydrogen stored in the storage space of the inner tank 14 (M10) includes, in case that it is determined that the plurality of temperature values exceed a second temperature value higher than the first temperature value range in the determining whether the plurality of temperature values are within the first temperature value range (M13), determining whether a pressure value of the storage space of the inner tank 14 is smaller than the first pressure value (M15). For example, the second temperature value may be 40K (kelvin).

The determining the level of liquid hydrogen stored in the storage space of the inner tank 14 (M10) includes, in response to it being determined that a pressure value of the inner tank 14 is smaller than the first pressure value in the determining whether the pressure value of the storage space of the inner tank 14 is smaller than the first pressure value (M15), determining that the storage space of the inner tank 14 is empty up to a warning level (M16). For example, the first pressure value may be 1 bar.

The determining the level of liquid hydrogen stored in the storage space of the inner tank 14 (M10) includes, in response to it being determined that the pressure value of the inner tank 14 is not smaller than the first pressure value in the determining whether the pressure value of the inner tank 14 is smaller than the first pressure value, determining that a level of the storage space of the inner tank 14 is at an empty level (M17). For example, the first pressure value may be 1 bar.

The determining the level of liquid hydrogen stored in the storage space of the inner tank 14 (M10) includes, in response to it being determined that all of the plurality of converted temperature values are not the same in the determining whether all of the plurality of converted temperature values are the same (M12), determining whether a temperature value of the second temperature sensor 11*b* located in the middle and a temperature value of the temperature sensor 11*a* installed at a position having a lowest height among the plurality of temperature sensors 11*a*, 11*b*, 11*c* is within the first temperature value range (M18). For example, the first temperature value may be 20K.

The determining the level of liquid hydrogen stored in the storage space of the inner tank 14 (M10) includes, in response to it being determined that the temperature value of the second temperature sensor 11*b* located in the middle and the temperature value of the first temperature sensor 11*a* installed at the position having the lowest height are within the first temperature value range in Step M18, determining that the level of the storage space of the inner tank 14 is at a medium level (M19-1).

The determining the level of liquid hydrogen stored in the storage space of the inner tank 14 (M10) includes, in response to it being determined that the temperature value of the second temperature sensor 11*b* located in the middle and the temperature value of the temperature sensor 11*a* installed at the position having the lowest height are not within the first temperature value range in Step M18, determining whether the temperature value of the temperature sensor 11*a* installed at the position having the lowest height is within the first temperature value range (M19-2).

Further, the determining the level of liquid hydrogen stored in the storage space of the inner tank 14 (M10) includes, in response to it being determined that the temperature value of the first temperature sensor 11*a* installed at the position having the lowest height is within the first temperature value range in Step M19-2, determining that the level of the storage space of the inner tank 14 is at a low level (M19-3); and in response to it being determined that the temperature value of the first temperature sensor 11*a* installed at the position having the lowest height is not within the first temperature value range in Step M19-2, determining that the level of the storage space of the inner tank 14 is at an empty level (M19-4)

In one embodiment, when a plurality of temperature sensors is attached in a middle position of the inner tank 14, a portion of the middle position may be further subdivided and displayed. For example, in case that a total of five temperature sensors are attached to the inner tank 14 by attaching three temperature sensors in the middle position of the inner tank 14, it is possible to display that: if the temperatures of the four temperature sensors below are the same, the level of the storage space is 80%; if the temperatures of the three temperature sensors below are the same, the level of the storage space is 60%; and if the temperatures of the two temperature sensors below are the same, the level of the storage space is 40%, and the like.

The determining the level of liquid hydrogen stored in the storage space of the inner tank 14 (M10) may include displaying a voltage value, a temperature value, and a pressure value converted from the electrical signals on the display (M11-1).

The determining the level of liquid hydrogen stored in the storage space of the inner tank 14 (M10) may include transmitting a level status of liquid hydrogen in the inner tank to an IOT server (not shown) through wireless communication (M11-2).

Meanwhile, the determining whether pressure of the inner tank 14 is within the appropriate pressure range based on pressure values measured by the pressure sensor 13 (M20) includes switching a pressure builder (not shown), which adjusts pressure in the storage space of the inner tank 14 to a predetermined pressure, into a turn on status (M21) in case that a measured pressure value is smaller than the first pressure value. For example, the first pressure value may be 1 bar.

The determining whether the pressure of the inner tank 14 is within the appropriate pressure range (M20) includes switching an operating status of the pressure builder to a turn off status in case that the measured pressure value is higher than the first pressure value but smaller than a second pressure value (M22). For example, the second pressure value may be 3 bar.

The determining whether the pressure of the inner tank 14 is within the appropriate pressure range (M20) may include transmitting the operating status of the pressure builder to the IOT server (not shown) through wireless communication (M23).

Figure 11:
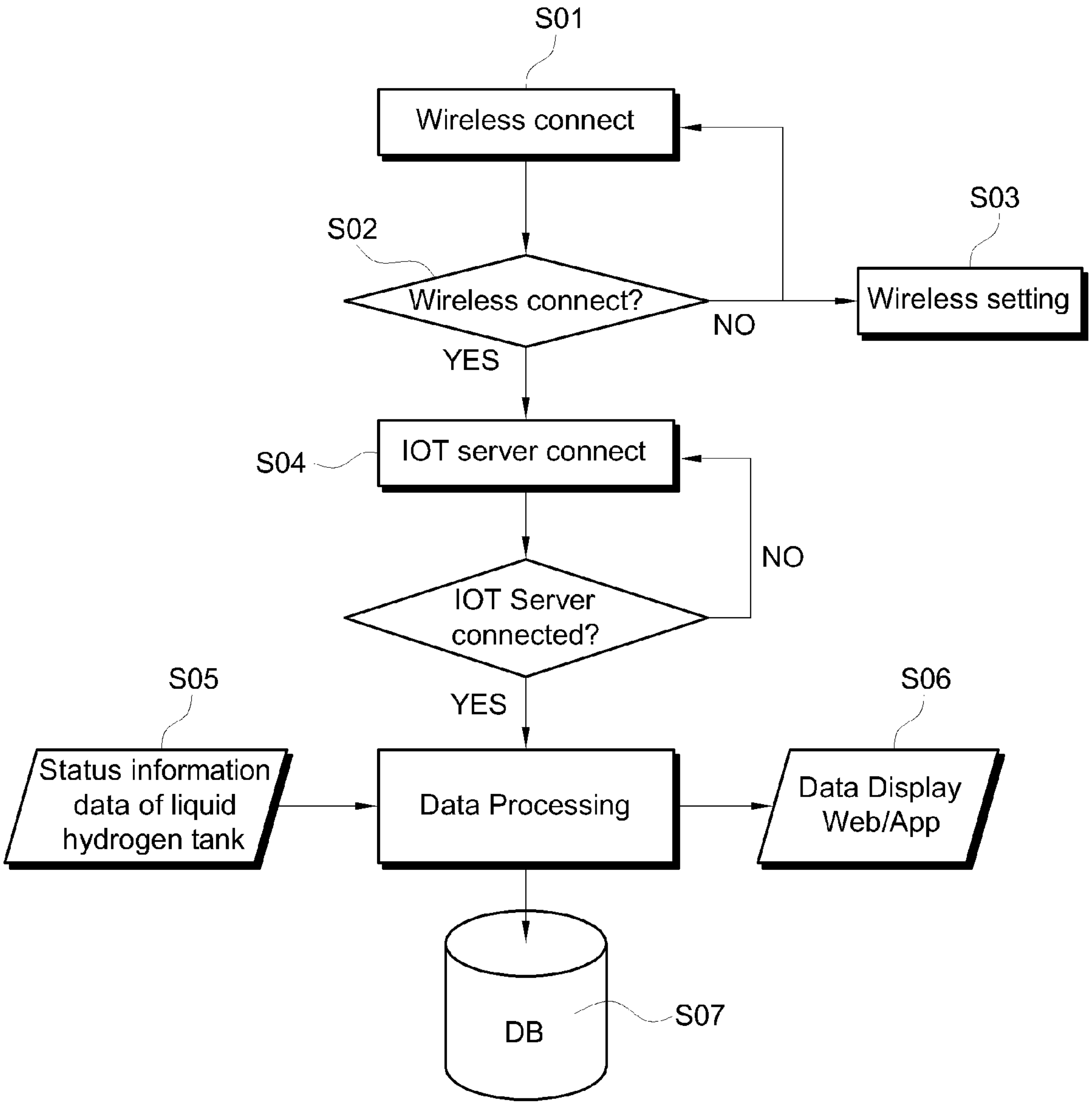
FIG. 11 is a flowchart illustrating some steps of a method of controlling a liquid hydrogen tank according to an embodiment of the present disclosure.

FIG. 11 is a flowchart illustrating some steps of a method of controlling a liquid hydrogen tank 10 according to an embodiment of the present disclosure.

Referring to FIG. 11, steps of storing information received from various sensors in a data log storage 113 and displaying the received information on the display 140 in the method of controlling the liquid hydrogen tank 10 are illustrated (S01 to S07).

Specifically, the method of controlling the liquid hydrogen tank 10 may include the steps that: a control board 112 allows a wireless communication module 116 to connect to a wireless communication network (S01); the control board 112 determines whether the wireless communication module 116 is connected to the wireless communication network (S02); the control board 112 performs wireless setting in response to a failure to connect to various sensors through wireless communication (S03); the control board 112 connects to an IOT server (not shown) in response to connecting to various sensors through wireless communication (S04); the control board 112 receives status information data of the liquid hydrogen tank 10 in response to the connecting to the IOT server (S05); the control board 112 displays status information data of the liquid hydrogen tank 10 on the display 140 (S06); and the control board 112 stores the status information data of the liquid hydrogen tank 10 in a database (data log storage) (S07).

Figure 12:
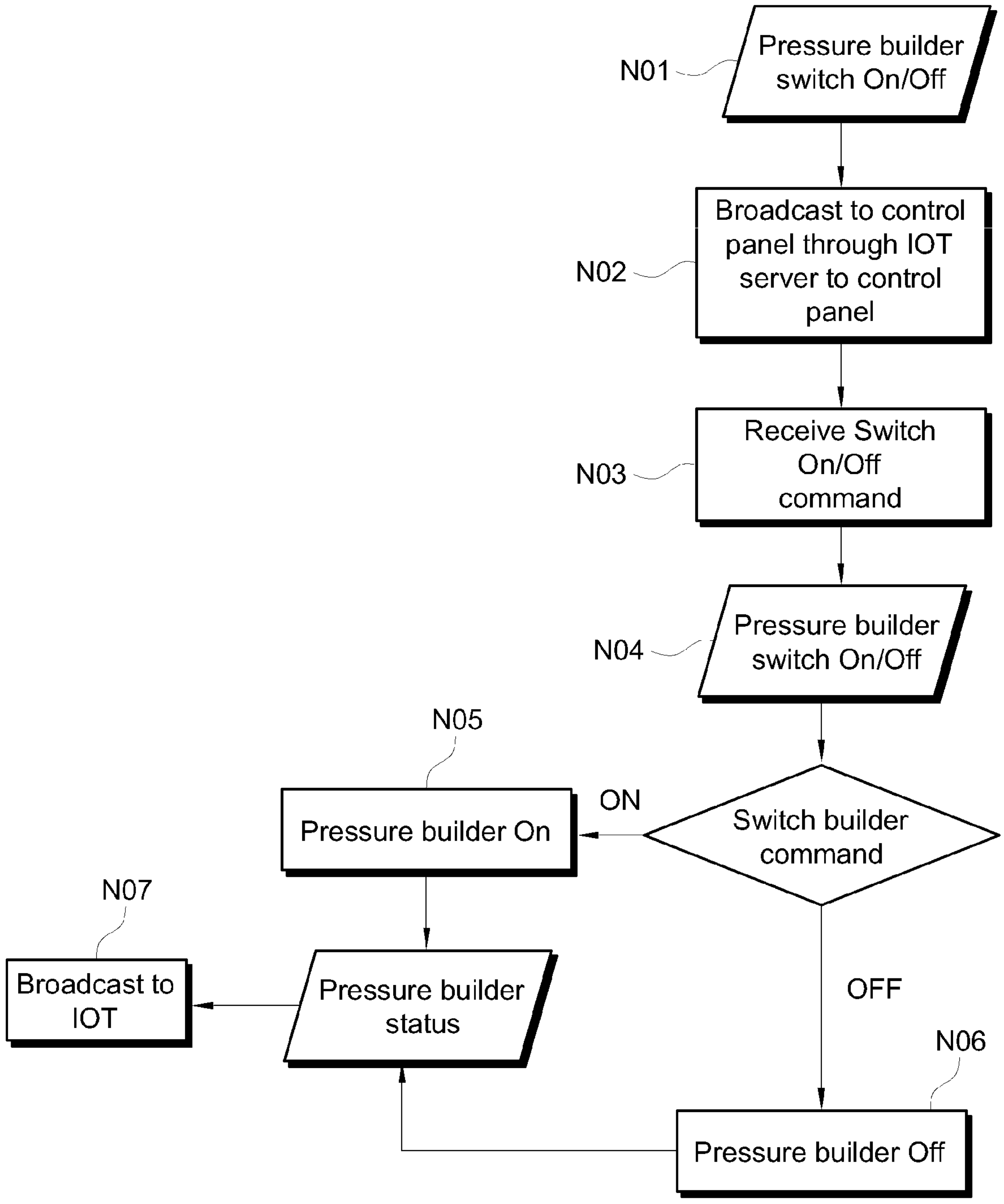
FIG. 12 is a flowchart illustrating some steps of a method of controlling a liquid hydrogen tank according to an embodiment of the present disclosure.

FIG. 12 is a flowchart illustrating some steps of a method of controlling a liquid hydrogen tank 10 according to an embodiment of the present disclosure (N01 to N07).

Referring to FIG. 12, a method for controlling the liquid hydrogen tank 10 according to an embodiment of the present disclosure may include steps of: performing On/Off control for a pressure builder switch by a control board 112 (N01); broadcasting On/Off control information to the control panel 115 through the IOT server by the control board 112 (N02); the pressure builder receiving a switch On/Off command (N03); the pressure builder being switched On/Off (N04); switching the pressure builder to a switch-on status in response to the pressure builder receiving a switch-on command (N05); switching the pressure builder to a switch-off status in response to the pressure builder receiving a switch-off command (N06); and transmitting operation status information of the pressure builder to the IOT server in response to the pressure builder being switched on or off (N07).

Although the above has shown and described various embodiments of the present disclosure, the present disclosure is not limited to the specific embodiments described above. The above-described embodiments can be variously modified and implemented by those skilled in the art to which the present invention pertains without departing from the gist of the present disclosure claimed in the appended claims, and these modified embodiments should not be understood separately from the technical spirit or scope of the present disclosure. Therefore, the technical scope of the present disclosure should be defined only by the appended claims.

In the embodiments disclosed herein, arrangement of illustrated components may vary depending on requirements or environment in which the invention is implemented. For example, some components may be omitted or some components may be integrated and implemented as one.

What is claimed is:

1. A liquid hydrogen tank control device comprising:

a control board capable of wireless communication and measuring a level of liquid hydrogen stored in a storage space of an inner tank of a liquid hydrogen tank based on a plurality of temperature values measured by a plurality of temperature sensors provided at different heights from each other on an outer surface of the inner tank located inside an outer tank of the liquid hydrogen tank, wherein the control board is configured to:

control On/Off of an opening/closing valve provided in a gas discharge pipe connected to the liquid hydrogen tank through a wireless communication module, control an electrical output of a fuel cell through the wireless communication module, and control On/Off of a heater through the wireless communication module.

2. The liquid hydrogen tank control device according to claim 1, wherein the control board is configured to determine that liquid hydrogen is filled from a bottom of the storage space of the inner tank to a height of a temperature sensor outputting a temperature value equal to or lower than a predetermined temperature value based on temperature values measured by the plurality of temperature sensors.

3. The liquid hydrogen tank control device according to claim 1, wherein the control board is configured to determine a status of the liquid hydrogen tank based on a pressure value measured by a pressure sensor capable of wireless communication and configured to measure a pressure in the storage space of the inner tank.

4. The liquid hydrogen tank control device according to claim 3, further comprising:

a memory configured to store status information including a received temperature value of the inner tank; and a display configured to display status information including the received temperature value of the inner tank, wherein the control board is configured to control operation of the heater configured to increase pressure of the liquid hydrogen tank.

5. The liquid hydrogen tank control device according to claim 1, further comprising:

a control panel provided in the liquid hydrogen tank control device and configured to allow a user to control at least one of On/Off of the opening/closing valve, operation of the heater, and the electrical output of the fuel cell.

6. A method of controlling a liquid hydrogen tank using a liquid hydrogen tank control device, wherein the liquid hydrogen tank control device comprises:

a plurality of temperature sensors provided at different heights from each other on an outer surface of an inner tank located inside an outer tank of the liquid hydrogen tank;

at least one pressure sensor configured to measure pressure of a storage space in which liquid hydrogen in the inner tank is stored; and a control board capable of wireless communication and measuring a level of liquid hydrogen stored in the storage space of the inner tank based on a plurality of temperature values measured by the plurality of temperature sensors, wherein the method comprises:

determining a level of liquid hydrogen in the inner tank based on the temperature values measured by the plurality of temperature sensors;

determining whether pressure in the inner tank is within an appropriate pressure range based on pressure values measured by the pressure sensor; and controlling On/Off of an opening/closing valve provided in a gas discharge pipe connected to the liquid hydrogen tank, electrical output of a fuel cell, and a heater through a wireless communication module of the control board.

7. The method according to claim 6, wherein the determining the level of liquid hydrogen stored in the storage space of the inner tank based on the temperature values measured by the plurality of temperature sensors comprises:

(a) converting electrical signals received from the plurality of temperature sensors into a plurality of temperature values;

(b) branching the determination based on a determination of whether all of the plurality of converted temperature values are the same, such that:

(i) when all of the plurality of converted temperature values are determined to be the same, the method further comprises:

determining that the inner tank is full of liquid hydrogen if the plurality of temperature values are within a first temperature value range;

determining that the storage space of the inner tank is empty up to a warning level if the plurality of temperature values exceed a second temperature value higher than the first temperature value range and a pressure value of the storage space is smaller than a first pressure value;

determining that the level of the storage space of the inner tank is at an empty level if the plurality of temperature values exceed the second temperature value and the pressure value is not smaller than the first pressure value;

(ii) when all of the plurality of converted temperature values are determined not to be the same, the method further comprises:

determining that the level of the storage space of the inner tank is at a medium level if the temperature values of the middle temperature sensor and a lowest temperature sensor are within the first temperature value range;

determining that the level of the storage space of the inner tank is at a low level if the temperature value of only the lowest temperature sensor is within the first temperature value range; and determining that the level of the storage space of the inner tank is at an empty level if the temperature value of the lowest temperature sensor is not within the first temperature value range; and (c) controlling, by the control board, the opening/closing valve, the fuel cell, and the heater through the wireless communication module based on the determined level.

8. The method according to claim 6, wherein the determining whether the pressure of the inner tank is within the appropriate pressure range based on the pressure values measured by the pressure sensor comprises:

switching either the opening/closing valve or the heater for adjusting a pressure in the storage space of the inner tank to a predetermined pressure to an operating status contingent upon a measured pressure value being smaller than a first pressure value; and switching the operating status of either the opening/closing valve or the heater to an interrupted status contingent upon the measured pressure value being larger than a second pressure value higher than the first pressure value.

* * * * *